United States Patent [19]
Han

[11] Patent Number: 5,435,151
[45] Date of Patent: Jul. 25, 1995

[54] AUTOMOBILE DISTILLER

[76] Inventor: Chin-Lung Han, No. 1-2, Lane 975, Chun-Jih Road, Tao-Yuan City, Taiwan

[21] Appl. No.: 240,185

[22] Filed: May 9, 1994

[51] Int. Cl.6 .......................................... F25D 21/00
[52] U.S. Cl. ................................. 62/272; 62/259.1; 62/239
[58] Field of Search ............... 62/272, 275, 276, 277, 62/279, 239, 244, 389, 390, 259.1

[56] References Cited

U.S. PATENT DOCUMENTS

| | | | |
|---|---|---|---|
| 3,675,442 | 7/1972 | Swanson | 62/272 |
| 5,106,512 | 4/1992 | Reidy | 62/272 |

Primary Examiner—John M. Sollecito
Attorney, Agent, or Firm—Morton J. Rosenberg; David I. Klein

[57] ABSTRACT

An automobile distiller generally comprises a water reservoir to collect the condensed water from the evaporator of the air conditioner. A distilling tank made from metal with high heat conductivity is seated onto the manifold of the engine. The steam generated therefrom is sent to the air conditioner for cooling and the distilled water is formed for drinking. By this arrangement, the condensed water and exhausted heat from engine can be completely recycled to provide distilled water for drinking.

6 Claims, 8 Drawing Sheets

AUTOMOBILE DISTILLER

BACKGROUND OF THE INVENTION

This invention relates to a distiller, more particularly, to an automobile distiller. The water condensed from the evaporator is collected and heated by the heat generated from engine to generate steam. The steam is then cooled by the chilled air generated by the air conditioner. Accordingly, a distilled cool water is available for drinking. On the other hand, the exhausted heat is recycled and a distilled water is available for drinking.

When driving in the hot days, even the air conditioner provides amiable and pleasant chilly air, the driver and the passengers always feel thirsty. This situation becomes worse when a traffic jam is met arid the provision for water become more and more important. On the other hand, if the air conditioner runs at a more high speed, the more condensed water is generated from the evaporator. Further more, the heat generated from the engine is exhausted completely.

Both the heat and condensed water are the by-product of the automobile. If the exhausted heat and condensed water can be recycled and used to generate the distilled water for drinking, it is really good to both driver and passengers.

SUMMARY OF THE INVENTION

It is the object of this invention to provide an automobile distiller wherein the condensed water collected from the evaporator is heated by the exhausted heat from the engine, then, the steam is cooled by the air conditioner to form the distilled water for drinking. Accordingly, the exhausted heat and condensed water are recycled.

It is still the object of this invention to provide an automobile distiller wherein the distilled water reservoir is disposed inside the vehicle. Accordingly, the distilled water is accessible for drinking. Furthermore, the distilled water can be cooled or heated for drinking.

It is still the object, of this invention to provide an automobile distiller wherein the distilled water reservoir can be refilled to provide water for drinking.

It is still the object of this invention to provide an automobile distiller wherein a water level detector is incorporated to provide the water needed for generating distilled water. On the other hand, a safeguard is incorporated to ensure the safety of the automobile distiller.

BRIEF DESCRIPTION OF THE DRAWINGS

The characteristics of the present invention and its advantages as compared to the known state of the prior art will be better understood from the following description, relating to the attached drawings which show illustratively but not restrictively an example of an automobile distiller. In the drawings.

DESCRIPTION OF THE PREFERABLE EMBODIMENT

Figure 1:
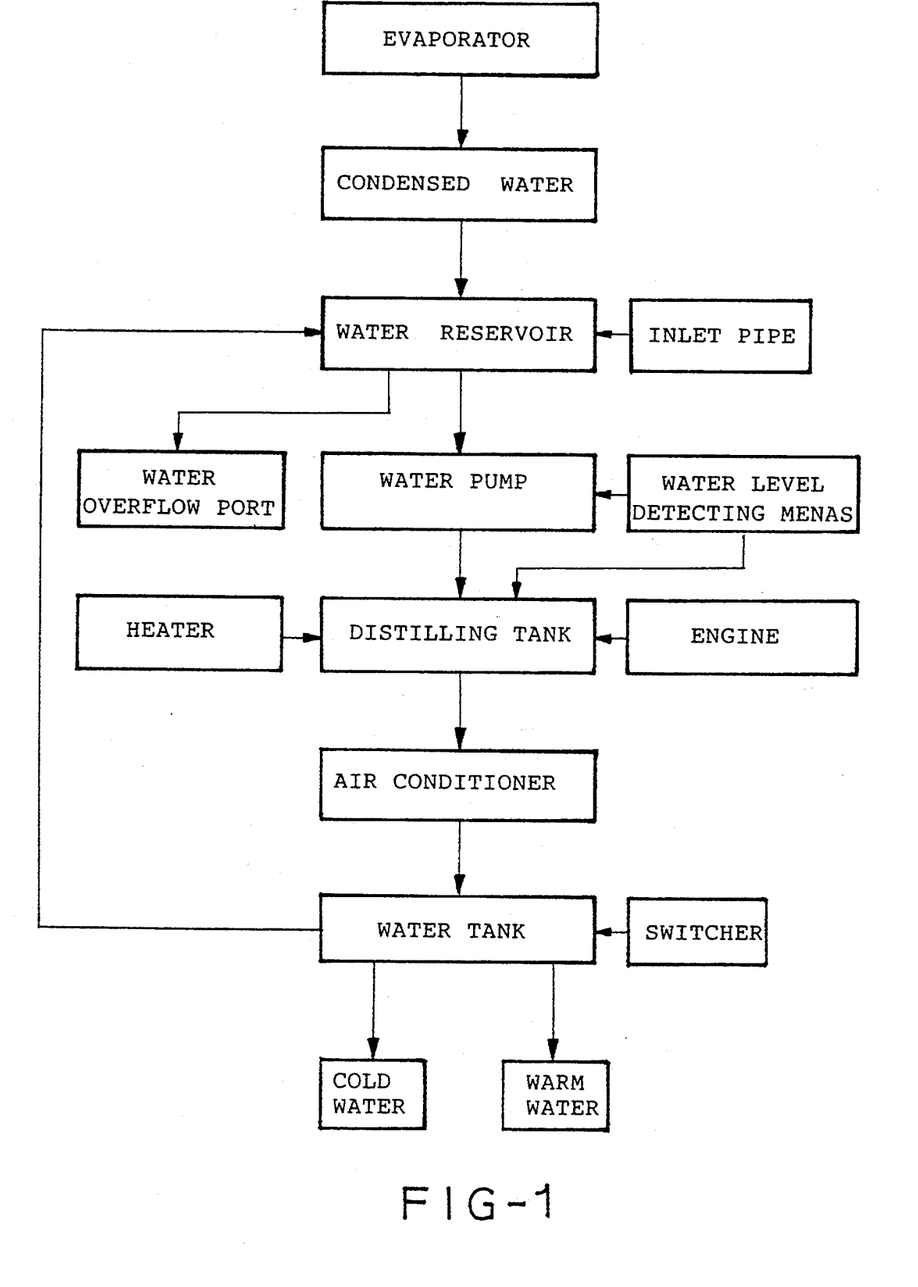
FIG. 1 is a flow chart of the automobile distiller made according to this invention.
Figure 2:
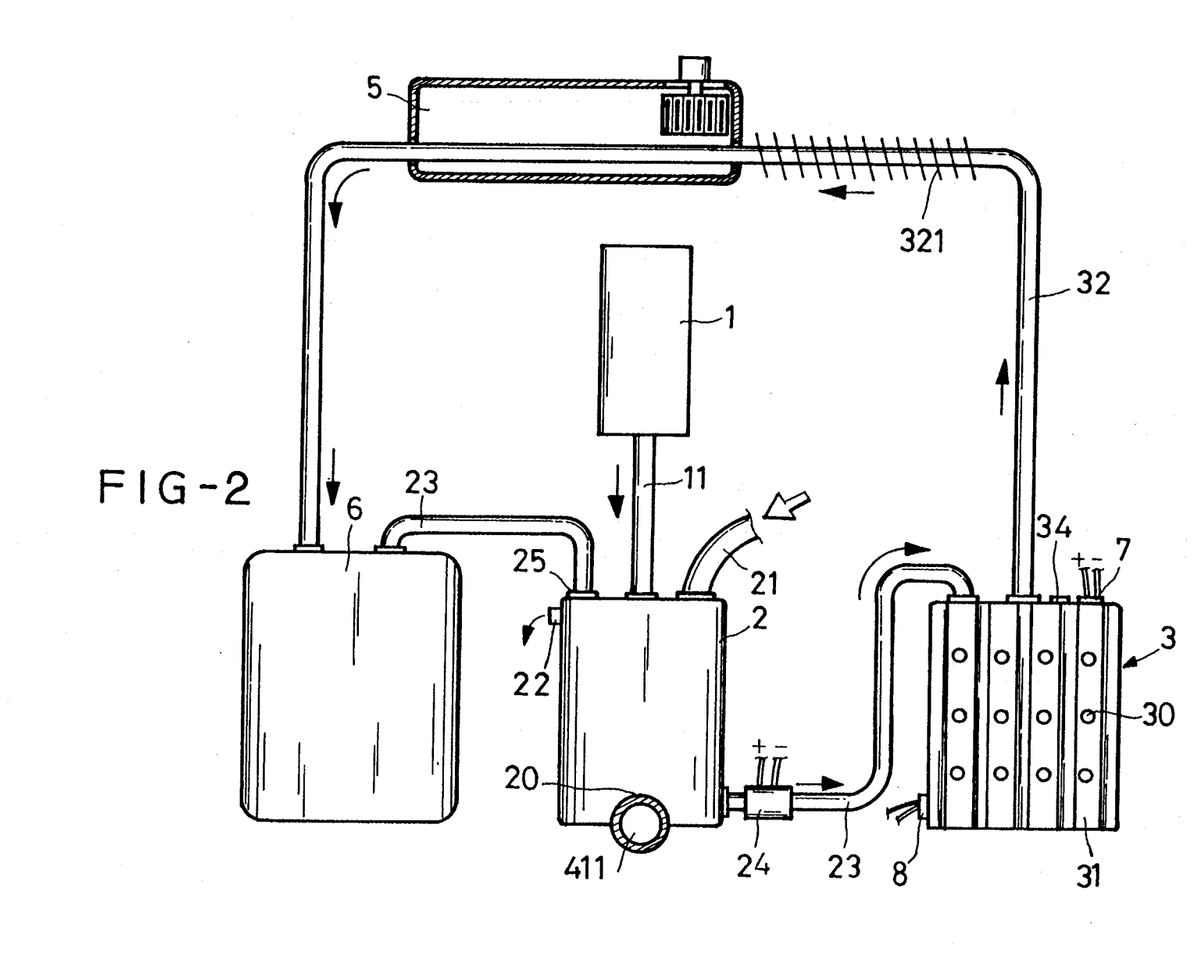
FIG. 2 is a sketch of the automobile distiller made according to this invention.

Referring to FIGS. 1 and 2, the evaporator 1 of the air conditioner will collect a lot of condensed water 10. Normally, these condensed water 10 is drained out through the conduit 11. Not only will the water scatter-all around, but also will the condensed water be completely wasted.

Accordingly, the condensed water 10 is collected and stored in a reservoir 2. As shown in FIG. 2, the bottom 20 of this reservoir 2 is fixed and in contact with the exhaust pipe 411. Accordingly, the water is preheated by the exhausted emission. On the other hand, the reservoir 2 is incorporated with an inlet 21 for refilling the water into the reservoir 2 in case the condensed water 10 is not enough to generate the steam. The reservoir 2 further includes an overflow discharge port 22 to discharge the extra water 10. Besides, the reservoir 2 is a collecting port 25 for recover the distilled water 10.

The reservoir 2 is incorporated with a pump 24 at the discharge pipe 23. Accordingly, the water is pumped to the distilling tank 3. The distilling tank 3 is enclosed box and made from metal with high heat conductivity. The bottom of the distilling tank 3 is provided with a plurality recessed slot 311 capable of seating on the manifold 23. As a result, the heat from the manifold 23 can be used to heat the bottom of the distilling tank 3. Because the heat from the manifold 23 is extremely hot, it is sufficient to heat the distilling tank 3 to generate the steam. On the other hand, the distilling tank 3 is made f n-ore metal with high heat conductivity. Only a few minute, ten to fifteen minutes, the water inside the distilling tank 3 is boiled. The steam is sent to the pipe 32 which routes from the air conditioner 5. Accordingly, the steam is chilled by the air flow generated from the air conditioner 5, then the distilled water is formed and directed to the drinking tank 6. On the other hand, the pipe 32 can be disposed with a plurality of fins 321 to increase the heat exchange.

Figure 3:
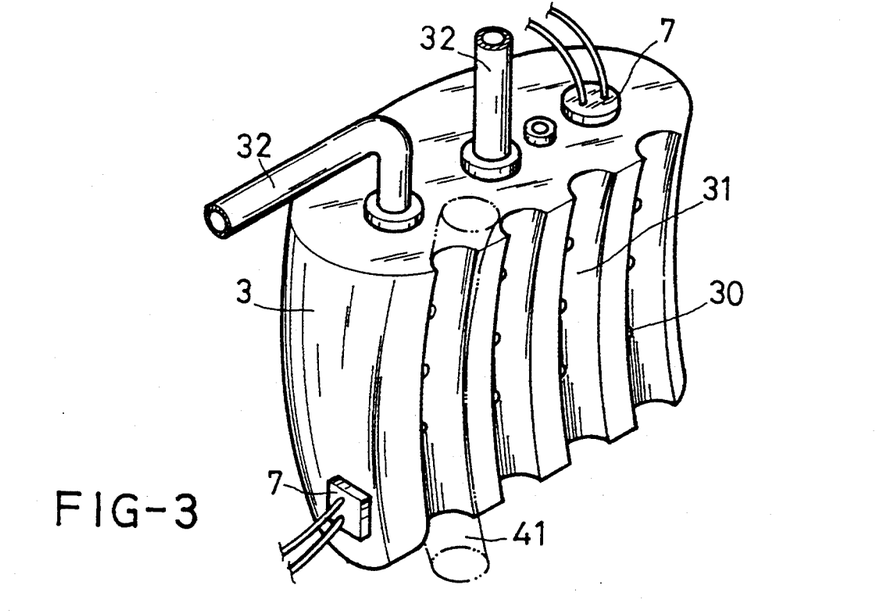
FIG. 3 is a perspective view of the distilling tank made according to this invention.
Figure 4:
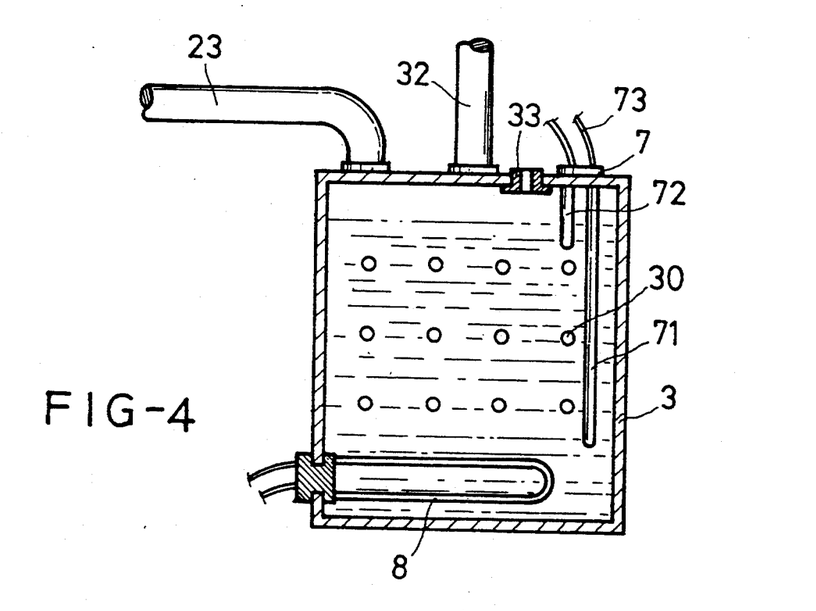
FIG. 4 is a cross section view of the distilling tank made according to this invention.

Referring to FIGS. 3 and 4, the detailed structure of the distilling tank 3 is disclosed. The bottom 31 of the distilling tank 3 is provided with a plurality of recessed slot 31 capable of seating on the manifold 41 firmly. By this arrangement, the heat transferred from the manifold 41 can be used efficiently to heat the distilling tank 3. On the other hand, the distilling tank 3 is incorporated with a water level detecting means 7 which includes a long probe 71 used to detect the low water level and a short probe 72 used to detect the high water level. The water level detecting means 7 is interconnected with the pump 24, as shown in FIG. 2, through a control circuit 73. By tills arrangement, the pump 24 is switched on/off to supply or cut off the water.

On the other hand, a heater 8 is provided at the bottom of the distilling tank 3 to heat the distilling tank 3. The power of the heater 8 is supplied from the alternator (not shown in Figure). A selector is incorporated inside the car to provide heat for the distilling tank 3 before the engine is warm. By this arrangement, the steam can be generated quickly. As a result, the heater 8 acts as an alternative when the engine is still cold.

Furthermore, a plurality of heating rods 30 extends into the distilling tank 3 to increase the vaporization of the water. By this arrangement, the heat from the manifold 41 can be transferred into the distilling tank 3 quickly. The time to boiling is shortened.

On the other hand, a thermostat can be incorporated inside the distilling tank 3. When the temperature inside the distilling tank 3 is higher than the upper limit, the power of the heater 8 is cut off to ensure the safety of the distilling tank 3. The detail of this part is not given since it belongs to the prior art.

Figure 5:
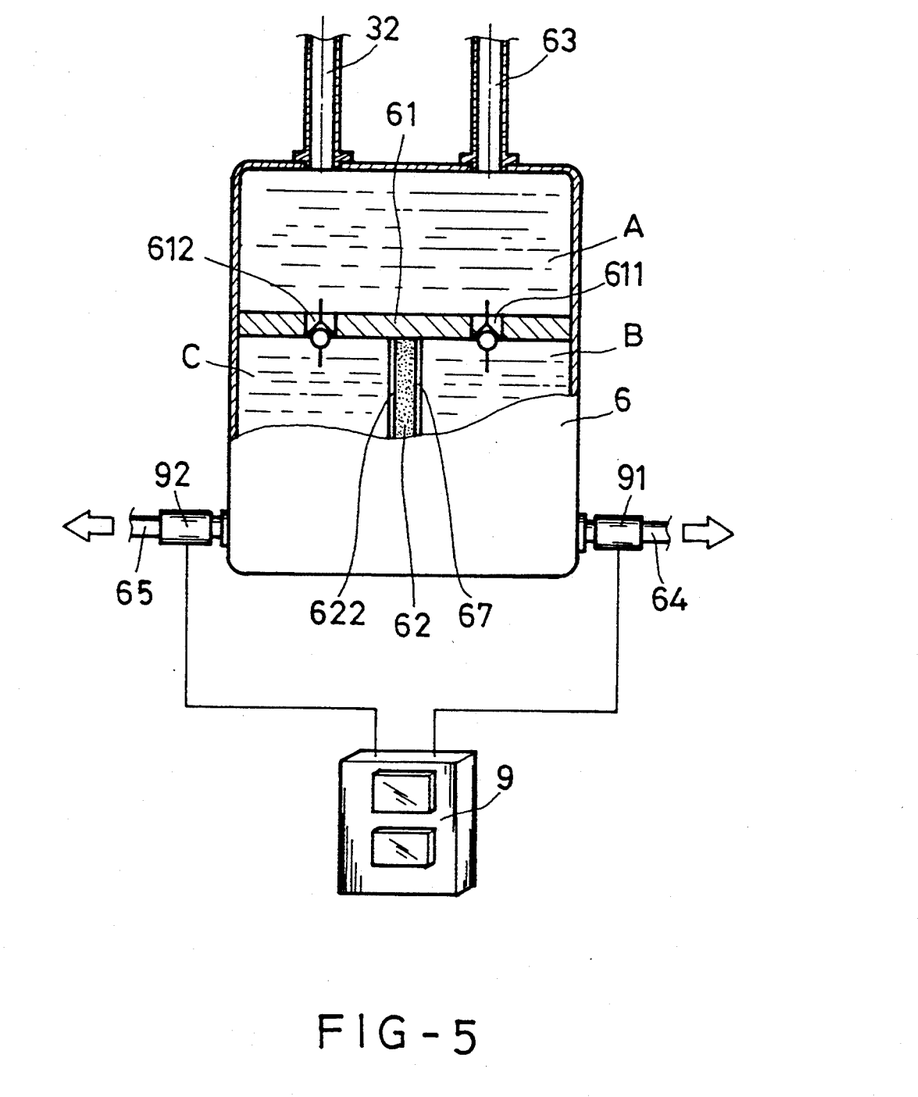
FIG. 5 is an elevational view of a drinking water tank that is partially broken.

FIG. 5 refers to the detailed configuration of the water tank for drinking. In general, the water tank divides into a cold water cell A, a warm water cell B and a hot water cell C. When the distilled water is sent to the water tank through the pipe 32, the distilled water is sent to the cold water cell A. These cells are separated by a partition 61 from the middle. As a result, the cold water cell A is located at the upper portion. The, lower part is further divided by a thermoelectric cooling module 62. The thermoelectric cooling module 62 is a practical and state-of-the-art device which inherits the following advantages, such as no refrigerant needed, no mechanical movement, intoxic, noiseless, long service life, compact size, light weight, and easy to install. The most important character is the thermoelectric cooling module 62 that can generate heat or iciness when the electricity is applied. Accordingly, when the electricity is applied, the surface 621 located at the warm water cell B can generate heat, as a result, the water is heated. On the other hand, the surface 622 located at the cold water cell C can generate iciness, the cold water is then cooled to chilled water.

Besides, the outlet of the partition 61 is incorporated with a check valve 611 (612) to prevent the backflow of the warm water or cold water into the cold water cell C. A backflow pipe 63 is provided at the upper part of the cold water cell C, then the overflow flows back to the reservoir 2.

The gradient of the thermoelectric cooling module 62 is sixty-four (64) Celsius and it is adjustable by the applied electricity. This belongs to the pre-existing technology and no description is given.

The water tank 6 has various configurations and it can be disposed adjacent to the air conditioner 5 or inside the vehicle. The discharge pipes 64 and 65 of the warm water cell B and cold water cell C are incorporated with a pump 91(92) respectively. The controlling switch 9 disposed at the dashboard, the warm water or cold water from the water tank 6 is provided.

Figure 6:
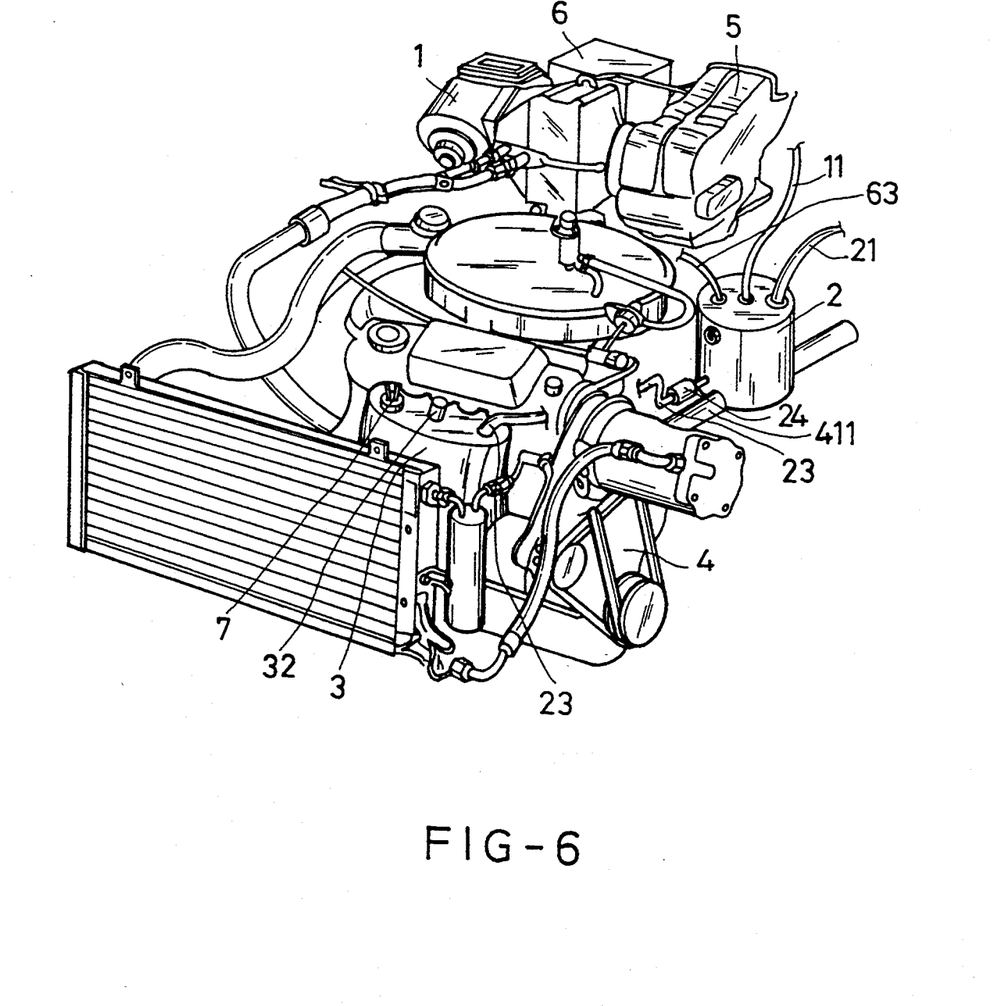
FIG. 6 is a sketch view showing the installation position of the distilling tank and water reservoir.

As shown in FIG. 6, there are varieties of arrangement of the distiller to conform the necessity. The reservoir 2 collects the condensed water from the evaporator 1 or it can be filled by added water. The pump 24 is used to deliver water to the distilling tank 3. The distilling tank 3 is seated at the manifold 41 to receive the heat generated from the engine. The steam generated therefrom can be cooled by the cold flow of the air conditioner, then the distilled water is formed and is directed to water tank 6. Accordingly, the condensed water and the exhausted heat are recycled for further utilization.

Figure 7:
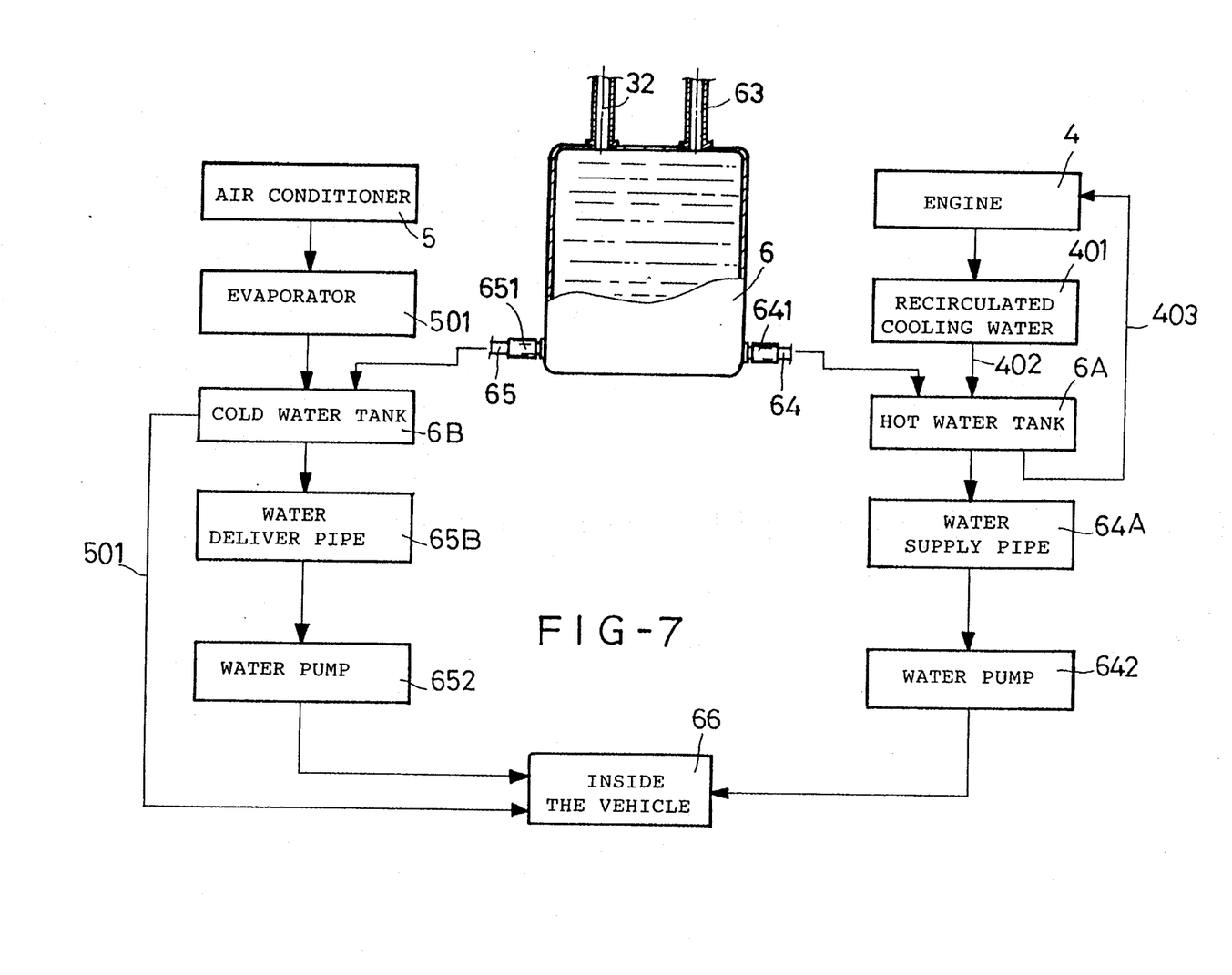
FIG. 7 is a flow chart of the second embodiment of the automobile distiller.
Figure 8:
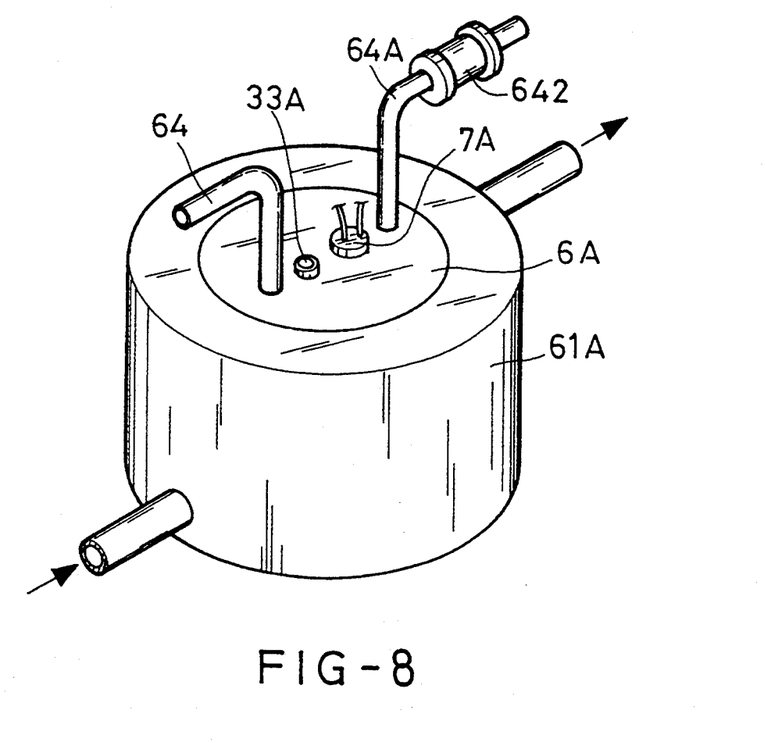
FIG. 8 is a perspective view of the hot water tank.
Figure 9:
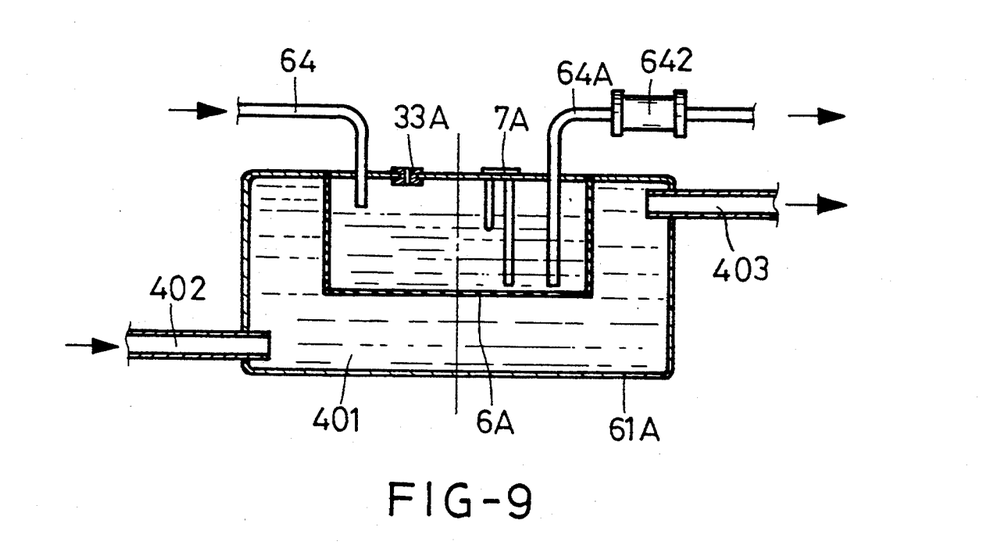
FIG. 9 is a cross sectional view of the hot water tank disclosed in FIG. 8.
Figure 10:
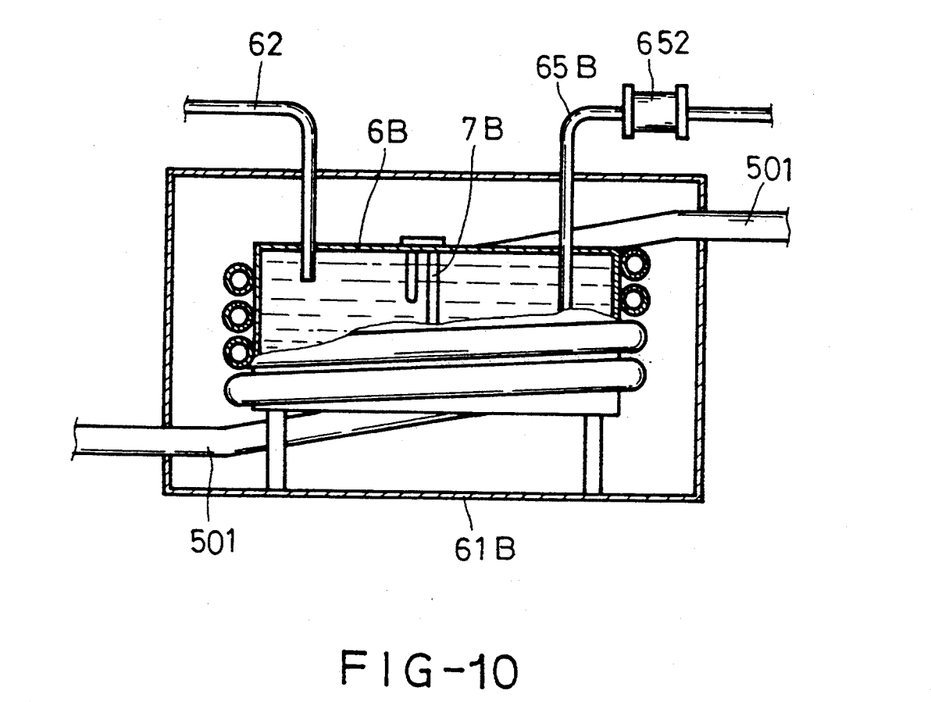
FIG. 10 is a cross sectional view of the cold water tank.

In the previous embodiment, the distiller system provided by the present invention provides both hot and cold water. By the application of thermoelectric cooling module 62 inside the water tank 6 while in the second embodiment, the system provides hot and cold water. As shown in FIG. 7, no partition and thermoelectric cooling module 62 are made inside the water tank 6. The water is directed into the water box 6 through the pipe 32. On the other hand, the distilled water is delivered to a hot water tank 6A through the discharge pipe 64. On the other hand, the distilled water is also sent to the cold water tank 6B through the discharge pipe 65. As shown in FIGS. 8, 9, the hot water tank 6A is an enclosed tank and a water level detecting means 7A is incorporated to detect the high or low level. Accordingly, the pump 641 which is incorporated at the pipe 64 is controlled to switch on/off the water supply. Consequently, the water can be remained in suitable level. On the other hand, a pressure relief valve 33A and a water supply pipe 64A are incorporated at the top of the water tank 6A. A pump 642 disposed at the water supply pipe 64A is used to deliver the hot water to the vehicle 66. Besides, even the evaporator 501 passes through the cold water tank 6B, no negative effect is exposed on it.

In conclusion, the automobile distiller can be concluded with the following advantages.

1. When the engine runs normally, the distilling tank is heated by the exhausted heat from the engine and a steam is generated for distilled water. Accordingly, the exhausted heat and condensed water are completely recycled. On the other hand, an electric heater is incorporated to act as an auxiliary heat source. Hence, the steam can be heated quickly.
2. The distilling tank is incorporated with a safeguard means. This safeguard means includes a water level detecting means to control the pump in delivering the water to the distilling pump. A pressure relief valve and a thermostat are incorporated to provide further safety. The power of the electric heater is cut off for further safety.
3. The reservoir receives both condensed water and, if necessary, added water from outside. Accordingly, even the air conditioner is not run, there is a plurality of water can be used to generate steam. Besides, the distilled water can be recollected and distilled again.
4. A thermoelectric cooling module is incorporated to provide both warm water and cold water.
5. The distiller collects both the condensed water from the evaporator and the exhausted heat from the engine. Those two energy is completely recycled.

Although the present invention has been described in connection with the preferred embodiment, many other variations and modifications will now become apparent to those skilled in the art without departing from the scope of the invention. It is preferred, therefore, that the present invention not be limited by the specific disclosure herein, but only by the appended claims.

I claim:

1. An automobile distiller, comprising
    a water reservoir capable of collecting condensed water from an evaporator of an air conditioner incorporated in said automobile, an inlet being provided for adding fresh water, a discharge port being provided for overflow of the water, a collecting port being provided at an upper portion of the reservoir, a pump being incorporated at a discharge pipe to deliver the water;
    a distilling tank made from a metal with high heat conductivity, the bottom of the distilling tank being seated on the manifold of the automobile engine, the automobile distiller is further comprised of means for delivering the steam generated from said distilling tank to said air conditioner to condense said steam thereby providing distilled water, and means for delivering said distilled water to a water dispensing tank for drinking.

2. An automobile distiller as recited in claim 1, wherein a water level detecting means is incorporated inside the distilling tank, a pair of detecting rods are incorporated to detect the level of the water and then control the actuation of the pump.

3. An automobile distiller as recited in claim 1, wherein an electric heater is incorporated at the bottom of said distilling tank, a pressure relief is disposed at the upper portion of said distilling tank.

4. An automobile distiller as recited in claim 1, wherein the distilling tank is seated onto the manifold of the engine.

5. An automobile distiller as recited in claim 1, wherein each of a warm water cell and cold water cell is incorporated with a pump, said water pump is controlled by a switch disposed on the dashboard.

6. An automobile distiller as recited in claim 1, wherein the distilled water of the water tank is delivered to a hot water cell to be heated by heat from the engine and to a cold water tank to be chilled by the air conditioner.

* * * * *